No. 622,853. Patented Apr. 11, 1899.
H. HILL & E. G. PRICE.
FOLDING PHOTOGRAPHIC CAMERA.
(Application filed Nov. 10, 1897.)

(No Model.) 2 Sheets—Sheet 1.

WITNESSES:

INVENTORS
Henry Hill and
Edwin Gladstone Price
BY
ATTORNEYS.

No. 622,853. Patented Apr. 11, 1899.
H. HILL & E. G. PRICE.
FOLDING PHOTOGRAPHIC CAMERA.
(Application filed Nov. 10, 1897.)

(No Model.) 2 Sheets—Sheet 2.

WITNESSES:

INVENTORS
Henry Hill and
Edwin Gladstone Price
BY
ATTORNEYS.

UNITED STATES PATENT OFFICE.

HENRY HILL AND EDWIN GLADSTONE PRICE, OF LONDON, ENGLAND.

FOLDING PHOTOGRAPHIC CAMERA.

SPECIFICATION forming part of Letters Patent No. 622,853, dated April 11, 1899.

Application filed November 10, 1897. Serial No. 658,015. (No model.)

*To all whom it may concern:*

Be it known that we, HENRY HILL and EDWIN GLADSTONE PRICE, subjects of the Queen of Great Britain, residing at 4 Berry street, Clerkenwell Road, London, England, have invented certain new and useful Improvements in or Relating to Photographic Folding Cameras, of which the following is a specification.

This invention relates to photographic folding or foldable cameras, and has for its object to produce a very compact foldable camera simple in construction and use and which can be readily set up or extended ready for use and also easily folded into very small compass when out of use.

We will now proceed to fully describe our present invention with reference to the accompanying drawings.

Figure 1:
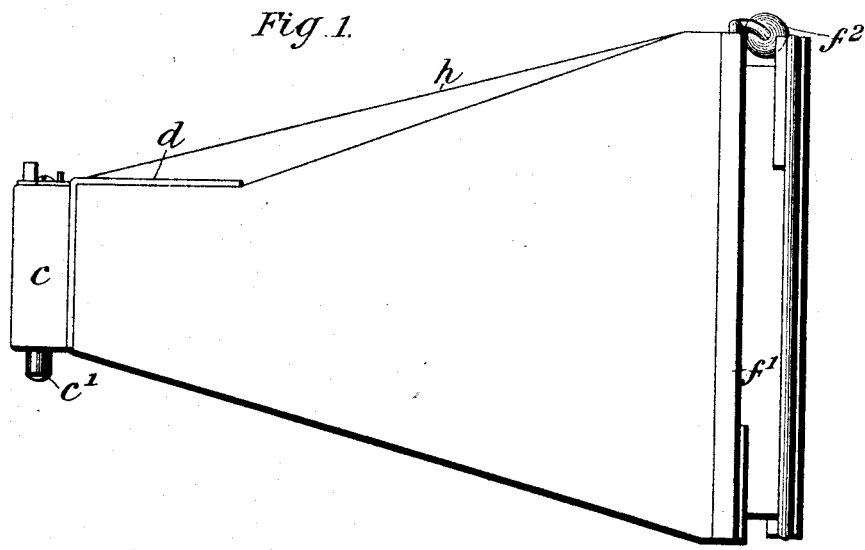
Figure 4:
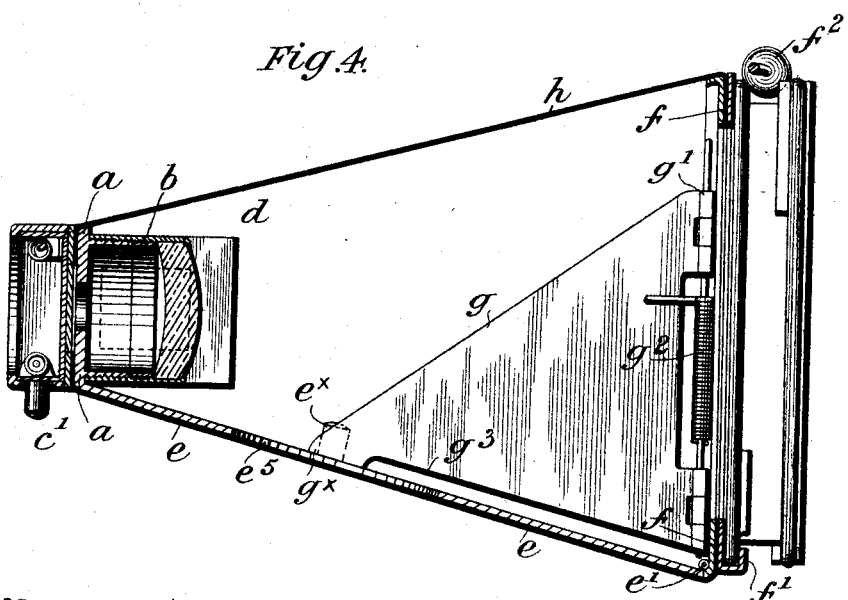
Figure 2:
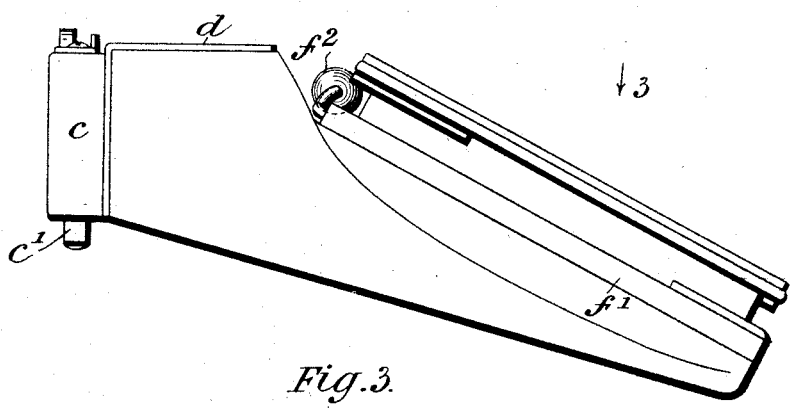
Figure 3:
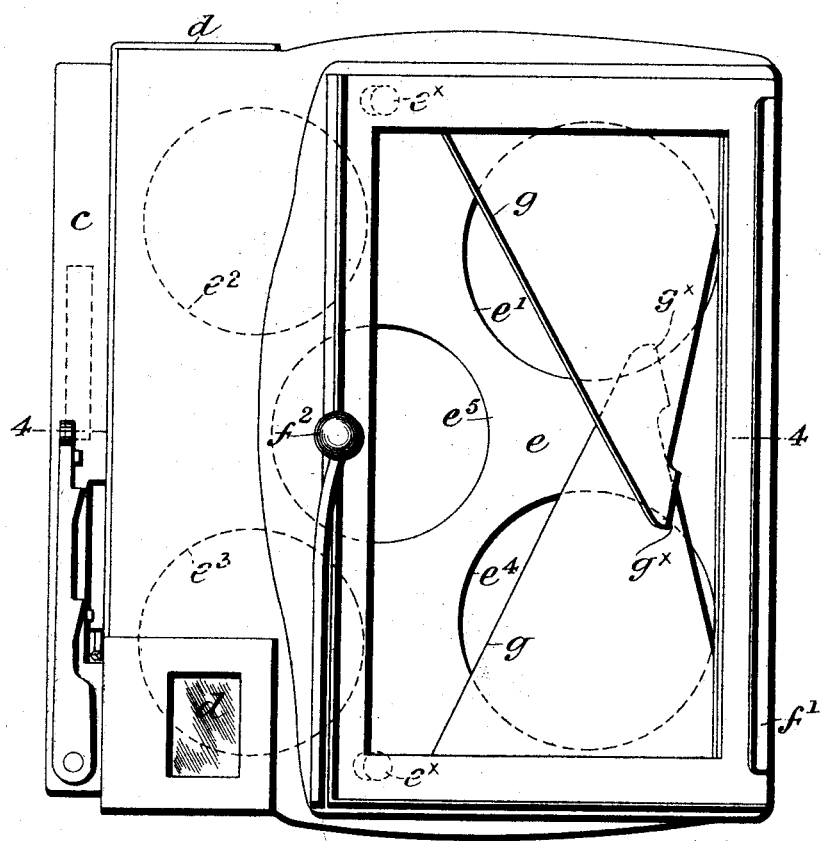

Figure 1 is a side elevation of the camera extended and having the plate-holder fixed in position. Fig. 2 is a side elevation of the camera folded and also having the plate-holder attached. Fig. 3 is a plan view of Fig. 2, that is, looking in the direction of the arrow 3, Fig. 2, with the plate-holder removed. Fig. 4 is a longitudinal vertical section on the line 4 4, Fig. 3.

$a$ is the fixed front, carrying the lens $b$ and also carrying any suitable construction of shutter in the shutter-case $c$, such shutter being of any suitable type, but advantageously of the self-capping character, which does not require setting, but which will give an exposure by simply causing said shutter to travel across the lens-aperture—for instance, by means of a knob, such as $c'$. To this lens-front $a$ one or more suitable view-finders $d$ may be attached in the usual or any suitable manner—for instance, one horizontal view-finder and one vertical view-finder. Also this lens-front $a$ has fixed thereto or, if desired, formed integrally therewith the side $e$, at an obtuse angle to said front $a$, this front $a$ and side $e$ being advantageously formed out of a single sheet of metal bent to the form shown at Fig. 4, and in order to lighten the camera as much as possible we cut out the five circular holes $e'$, $e^2$, $e^3$, $e^4$, and $e^5$, as shown in Fig. 3, or this side plate or frame $e$ may be formed as a frame or in any other suitable manner, provided same is sufficiently rigid in itself and also rigid with respect to the lens-front $a$. To the back end of this side plate $e$ we hinge at $e'$ the folding back or hinged frame $f$, which latter is formed in any suitable manner and adapted to receive and hold thereon the plate-holder (or it may be a changing-box or a focusing-screen, &c.) in any suitable manner. For instance, we provide the channel or turned-up edge $f'$, in which one edge of the plate-holder is inserted, the upper edge of said plate-holder being held by the spring-knob or spring-catch $f^2$, or instead of the latter a second channel similar to $f'$ (only inverted) may be fixed or formed along the top edge of the frame $f$, so that the plate-holder, changing-box, &c., may be slid in edgewise along said channels $f'$. To the inside face or inner side of said frame $f$ we attach two gusset-like pieces or wings $g$, each of the latter being hinged at $g'$ to said frame $f$, with a spring $g^2$ combined therewith, so that each wing $g$ is normally pressed by its said spring $g^2$ outward—i. e., against the stop-pieces $e^\times$, fixed on the inside face of the frame $e$—while when the end $g^\times$ of each said wing $g$ is pressed inward, so that said wings are brought into position or plane parallel to the plane of the frame $f$, thereby the springs $g^2$ are under tension, so that when the frame $f$ is raised up from its folded position, (with the gusset-pieces $g$ folded parallel therewith,) as in Figs. 2 and 3, thereby these springs will force said wings $g$ outward into position at right angles, or thereabout, to the plane of said frame when the latter has been sufficiently raised to permit said folded wings $g$ to thus extend themselves until they are brought to rest against the stop $e^\times$, in which position these wings $g$ serve to hold the said frame $f$ rigid with the plane of the sensitive surface in the latter at right angles to the longitudinal axis of the lens $b$, such wings or gussets $g$ preventing the frame $f$ from being folded down again close to the side $e$ unless and until the ends $g^\times$ of said wings are pressed inward toward one another, while, on the other hand, the frame $f$ is prevented from being opened too far by reason of the latter being hinge-bound with respect to the side $e$. Any suitable flexible light-tight material $h$ is fixed to and fitted closely around said frame $f$ and completely incloses the side or metal frame $e$, and also such material $h$ is fitted closely around and to the edge of the lens-front $a$, all in a light-tight manner. Thus to set the camera up for use it is only necessary to swing out the frame $f$ upon its hinge $e'$ from the folded position shown in Fig. 2 into the extended position shown in Fig. 1, and thereupon the spring-wings or gusset-like pieces $g$ will automatically swing outward into the position shown in Fig. 4, and thereby the camera is erected and held rigid ready for use.

It will be obvious that the spring-mounted gusset-like pieces or wings $g$ instead of being hinged to the frame $f$ may be hinged along the lower edge $g^3$ thereof to the fixed side $e$, so that when the frame is lifted or moved outward thereby the wings thus mounted would swing outward until they come to rest against stops provided on the inside face of the frame $f$, and thus act as before to hold the latter rigid with respect to the lens-front and side $e$, this arrangement permitting the camera to be folded or collapsed as before.

Having thus described our invention, what we claim as new, and desire to secure by Letters Patent of the United States, is—

1. A photographic folding camera, consisting of a lens-front, a side piece, a folding back hinged to the latter, spring-actuated side wings, coacting with said back, said side wings folding in between and across the side piece and back, and a suitable flexible casing fitted to said parts, substantially as set forth.

2. A photographic folding camera, consisting of a lens-front, a side piece fixed rigidly to the lens-front and extending obliquely therefrom, a back connected with the side piece, automatically and outwardly opening side wings coacting with said back, and adapted to be confined by said back against said oblique side piece, behind the lens-front, and a suitable flexible casing fitted to said parts, substantially as set forth.

3. A photographic folding camera, consisting of a lens-front, a side piece, a folding back hinged to the latter, outwardly-movable side wings hinged to the opposite ends of said back, springs for actuating the side wings, and automatically opening them as the back is moved away from the side piece, and a suitable flexible casing fitted to said parts, substantially as set forth.

4. A photographic folding camera, consisting of a lens-front, a side piece, a folding back hinged to the latter, automatic spring-actuated and outwardly-opening side wings coacting with said back, stops for limiting the outward movement of the said wings, the said wings being adapted to be folded in between the back and side pieces, and a suitable flexible casing fitted to said parts, substantially as set forth.

HENRY HILL.
EDWIN GLADSTONE PRICE.

Witnesses:
HENRY BIRKBECK,
EDWIN GAUDER.